Patented Nov. 10, 1942

2,301,561

UNITED STATES PATENT OFFICE 2,301,561

SULPHONATED ISOPHORONES

Clinton W. MacMullen and Herman A. Bruson, Philadelphia, Pa., assignors to Röhm & Haas Company, Philadelphia, Pa.

No Drawing. Application February 18, 1941, Serial No. 379,478

8 Claims. (Cl. 260—503)

This invention relates to sulphonation products of isophorones, more particularly to water-soluble sulphonation products of isophorones having 9 carbon atoms or more in the molecule.

It has heretofore been known that the alcohols which result upon hydrogenation of isophorones may be sulphated or sulphonated to yield water-soluble bodies having capillary activity. It is now found that the isophorones themselves of 9 or more carbon atoms react with sulphuric acid and related sulphonating agents to yield soap-like products which in aqueous solutions provide exceptional wetting-out action. The sulphated or sulphonated isophorone derivatives, particularly those having 15 or more carbon atoms, have also valuable dispersing, penetrating, emulsifying and cleansing properties.

Sulphonating agents and isophorones react to give water-soluble products. As sulphonating agent there may be used concentrated or fuming sulphuric acid, advantageously in the presence of acetic anhydride, sulphur trioxide, chlorosulphonic acid, etc. An inert organic solvent may be used, if desired. The sulphonation proceeds smoothly at temperatures between about 0° C. and about 60° C. The resulting products are advantageously neutralized with water-soluble alkalies, ammonia or amines. It is understood that the terms "sulphonation," "sulphonating agents," and "sulphonation products" are used in the broad sense herein and are intended to include sulphation, sulphating agents, and sulphated products.

The isophorones which may be used include isophorone itself, although this compound gives products having a lower degree of capillary activity than the higher isophorones, the $C_{12}$ and higher isophorones, particularly those having 15 to 57 carbon atoms, as prepared by the alkaline condensation of aliphatic ketones having 5 to 19 carbon atoms, as described in U. S. Patent No. 2,148,103, issued February 21, 1939. The alkyl mono-ketones of at least five carbon atoms, as shown therein, having a methyl group attached to the carbonyl group and at least one hydrogen atom attached to the α-carbon atom of the other alkyl group react on heating in the presence of an alkali metal oxide, hydroxide, or amide to form cyclic compounds having a keto-group. The exact structure of these isophorones obtained by internal condensation has not been fully established and it is probable that the condensation yields a mixture of isomers. Such a mixture, however, is entirely suitable for the preparation of the surface-active materials here described and it is not required that the pure isophorones be used.

The following examples illustrate this invention.

Example 1

122 g. of 98% $H_2SO_4$ was added dropwise to 122 g. of acetic anhydride with cooling, and the mixture stirred one hour while the temperature was held below 30° C. 348 g. of the $C_{24}$ isophorone obtained from methyl hexyl ketone was added dropwise with cooling, and this mixture stirred for 24 hours at 25–35° C. The mixture was then neutralized with sodium hydroxide solution and stirred several hours. When this mixture was left standing overnight, two layers formed, the lower of which was a saturated salt solution which was separated and discarded.

The sulphonation product from the $C_{24}$ isophorone was obtained, as a paste, from the upper layer on evaporation. It gave aqueous solutions which had pronounced capillary activity and which at low concentrations wet out grey cotton yarn instantaneously, when tested according to the method of Draves. (A. A. T. C. C. 1934 Year Book, pp. 143–146.)

Example 2

122 g. of 98% $H_2SO_4$ was added dropwise to 122 g. of acetic anhydride with cooling, and the mixture stirred one hour below 30° C. 306 g. of $C_{21}$ isophorone (obtained from methyl amyl ketone as in Example 2 of U. S. Patent No. 2,148,103) was added dropwise with cooling and the mixture stirred 24 hours at 25–40° C. The mixture was neutralized with sodium hydroxide solution, stirred, and left standing to form two layers. The lower layer, containing most of the sodium sulphate, was discarded.

The sulphonation product from the $C_{21}$ isophorone was obtained as a paste from the upper layer. It had pronounced capillary activity, and at very low concentrations wet out grey cotton yarn instantaneously when tested according to the method of Draves.

Example 3

Sulphur trioxide was passed with cooling into a mixture of 44 g. of dioxane and 150 cc. of ethylene dichloride until the gain in weight amounted to 40 g. Then 66 g. of $C_{18}$ isophorone (obtained from methyl isobutyl ketone) was added while the temperature was maintained below 40° C. Stirring was continued for one and one-half hours. 400 cc. of water was then added to extract the product in an aqueous phase. The ethylene dichloride layer was separated and discarded. The solution was warmed on the steam bath for two and one-half hours, neutralized with sodium hydroxide solution, concentrated, the salt precipitated by the addition of isopropanol, and the mixture filtered. The filtrate was heated to evolve the solvent, leaving a concentrated aqueous solution of the sulphonation product of the $C_{18}$ isophorone. It had pronounced capillary activity as measured by wetting-out time, or by the tensions of its solutions.

*Example 4*

70 g. of 20% oleum was added to 70 g. of acetic anhydride with cooling, and 81 g. of $C_{15}$ isophorone (obtained from methyl propyl ketone) was dropped into this mixture with cooling. Stirring was continued 20 hours at 25–35° C.

The mixture was neutralized with sodium hydroxide solution and concentrated to a solid on the steam bath. This solid was extracted with alcohol to obtain the sulphonation product free from sodium sulphate. The alcohol was evaporated leaving a product which was readily soluble in water. The sulphonation product of the $C_{15}$ isophorone was thus obtained as a clear aqueous solution which exhibited capillary activity.

*Example 5*

51 g. of 20% oleum was added to 51 g. of acetic anhydride with cooling, and 45 g. of $C_{12}$ isophorone (obtained from methyl ethyl ketone) was added dropwise with cooling. The mixture was then stirred 20 hours at approximately 25° C., and neutralized with sodium hydroxide solution. Isopropanol was added causing formation of two liquid layers, the lower of which contained most of the sodium sulphate as a strong salt brine and the upper of which contained the desired sulphonation products. The layers were separated and the upper heated to remove the alcohol. The sulphonation product of the $C_{12}$ isophorone was taken up in water to give a clear solution which had wetting and sudsing properties.

*Example 6*

204 g. of 20% oleum was added to 204 g. of acetic anhydride with cooling, and 138 g. of the $C_9$ isophorone obtained from acetone was added dropwise with cooling. The mixture was stirred 26 hours at 30–40° C., and neutralized with sodium hydroxide solution. The reaction mixture was evaporated to dryness, and the resulting solid extracted with ethylene glycol monomethyl ether and toluene. The solvents were removed from the extract by heating at low pressure. The product thus obtained was soluble in water, giving solutions which had markedly reduced surface tensions and interfacial tensions against oils.

*Example 7*

50 g. of 20% oleum was added dropwise with stirring and cooling to 174 g. of the $C_{24}$ isophorone (obtained by the alkaline condensation of methyl hexyl ketone) and the mixture stirred 30 hours at 13–25° C. The reaction mixture was neutralized with 10% sodium hydroxide solution and on standing separated into three layers. The intermediate layer, containing the desired sulphonation product, was separated from the upper oil layer and lower brine layer which were discarded.

The soap layer was a concentrated solution of the sulphonation product of the $C_{24}$ isophorone, which displayed pronounced capillary activity. Under the mild reaction conditions of this preparation the primary product is probably a sulphate ester, whereas with more vigorous reaction the products may be both sulphated and sulphonated. The sulphate group may be hydrolyzed to yield hydroxy sulphonates. As all of these types of sulphonation products are similarly capillary active, they are all included within the term sulphonation products of the isophorones.

We claim:

1. A capillary-active compound comprising a water-soluble sulphonation product of an isophorone having at least 15 carbon atoms.

2. A capillary-active water-soluble sulphonation product of an isophorone having from 15 to 57 carbon atoms in the molecule, prepared by the alkaline condensation of saturated alkyl monoketones of at least five carbon atoms, having a methyl group directly attached to the carbonyl group and at least one hydrogen atom attached to the α-carbon atom of the other alkyl group.

3. An alkali metal salt of a sulphonated isophorone having at least 15 carbon atoms.

4. A water-soluble sodium salt of a sulphonated isophorone having 18 carbon atoms in the molecule, derived from the internal alkaline condensation of methyl-isobutyl ketone.

5. A water-soluble sodium salt of a sulphonated isophorone having 21 carbon atoms in the molecule, derived from the internal alkaline condensation of methyl-n-amyl ketone.

6. A water-soluble sodium salt of a sulphonated isophorone having 24 carbon atoms in the molecule, derived from the internal alkaline condensation of methyl-n-hexyl ketone.

7. A process for making capillary-active compounds which comprises reacting a sulphonating agent selected from a member of the group consisting of concentrated sulphuric acid, fuming sulphuric acid, sulphur trioxide, and chlorosulphonic acid and an isophorone having at least 15 carbon atoms.

8. A process for making capillary-active compounds which comprises reacting a sulphonating agent selected from a member of the group consisting of concentrated sulphuric acid, fuming sulphuric acid, sulphur trioxide and chlorosulphonic acid and an isophorone having 15 to 57 carbon atoms in the molecule, prepared by the alkaline condensation of saturated alkyl monoketones of at least five carbon atoms having a methyl group directly attached to the carbonyl group and at least one hydrogen atom attached to the α-carbon atom of the other alkyl group.

CLINTON W. MacMULLEN.
HERMAN A. BRUSON.